Nov. 16, 1937.     G. THORP ET AL     2,099,634
APPARATUS FOR HEAT TREATING GRANULAR FOODS
Filed July 11, 1936     3 Sheets-Sheet 1

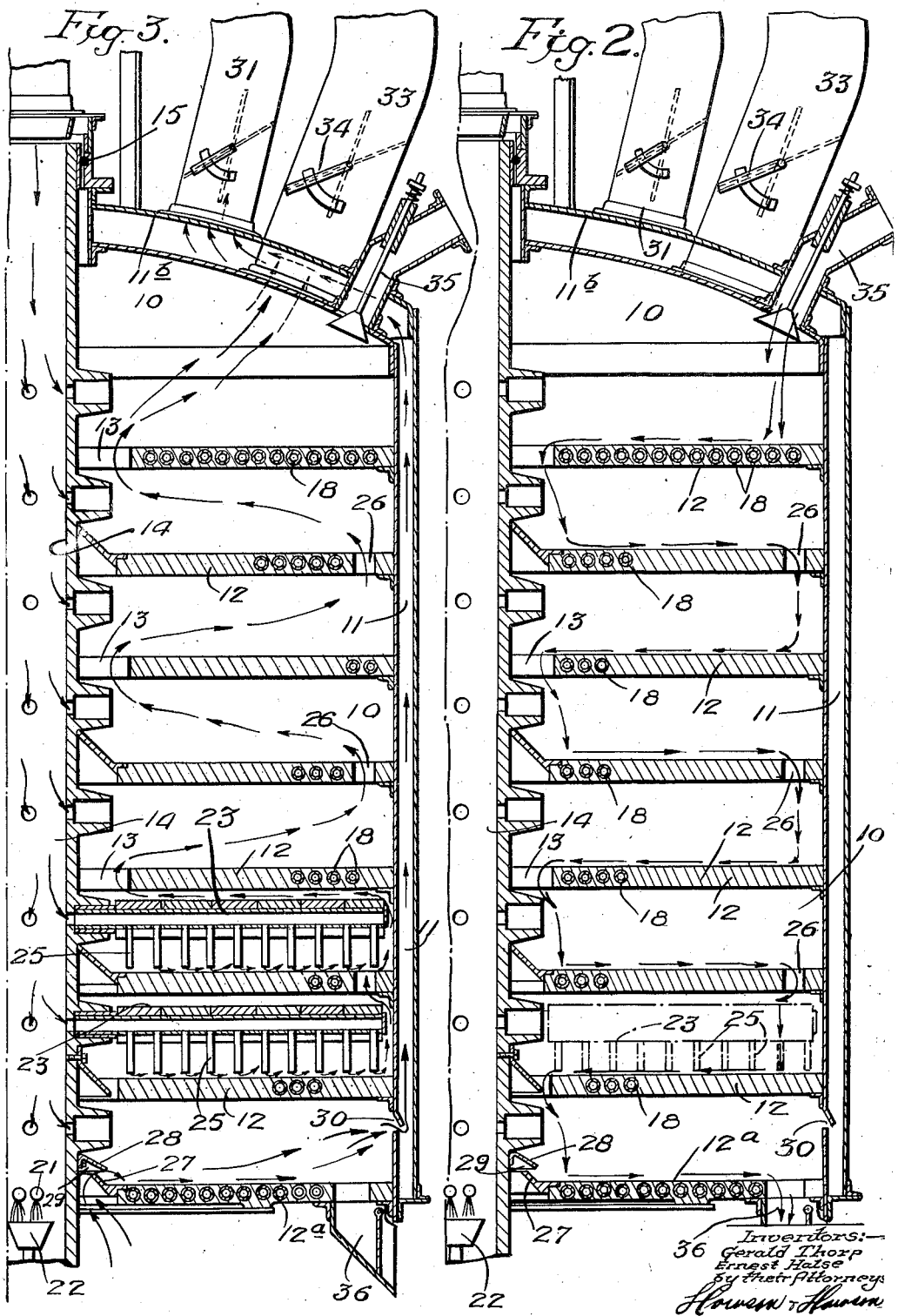

Nov. 16, 1937.   G. THORP ET AL   2,099,634
APPARATUS FOR HEAT TREATING GRANULAR FOODS
Filed July 11, 1936   3 Sheets-Sheet 3

Inventors:—
Gerald Thorp
Ernest Halse
by their Attorneys
Howson & Howson

Patented Nov. 16, 1937

2,099,634

UNITED STATES PATENT OFFICE 2,099,634

APPARATUS FOR HEAT TREATING GRANULAR FOODS

Gerald Thorp and Ernest Halse, Bethlehem, Pa., assignors to Bethlehem Foundry & Machine Company, Bethlehem, Pa., a corporation of Pennsylvania Application July 11, 1936, Serial No. 90,215

11 Claims. (Cl. 34—23)

This invention relates to apparatus for heat treating or roasting foodstuffs, and more particularly granular or nodular foodstuffs such as coffee and cocoa beans, nuts or the like, and has for an important object the provision of an apparatus wherein the roasting and subsequent cooling operations may be carried on as a continuous process in the same machine.

A further object of the invention is the provision in an apparatus of this character of an arrangement such that the roasting time may be very closely regulated and deleterious gases or vapors removed from the substances may be conveniently removed prior to the cooling step.

Another object of the invention is the provision of an arrangement whereby the cooling step is accompanied by circulation of air through the cooled material during the time when it is being agitated so that all vapors may be driven therefrom, and means whereby this cooling air may be subsequently preheated and during the time it is preheated act as an insulation for the walls of the treating chamber.

These and other objects we attain by the construction shown in the accompanying drawings wherein, for the purpose of illustration, we have shown a preferred embodiment of our invention and wherein:

Fig. 2 is a fragmentary sectional view showing the direction of travel of the treated material through the apparatus;

Fig. 3 is a similar section showing the travel of air through the apparatus.

Figure 1:
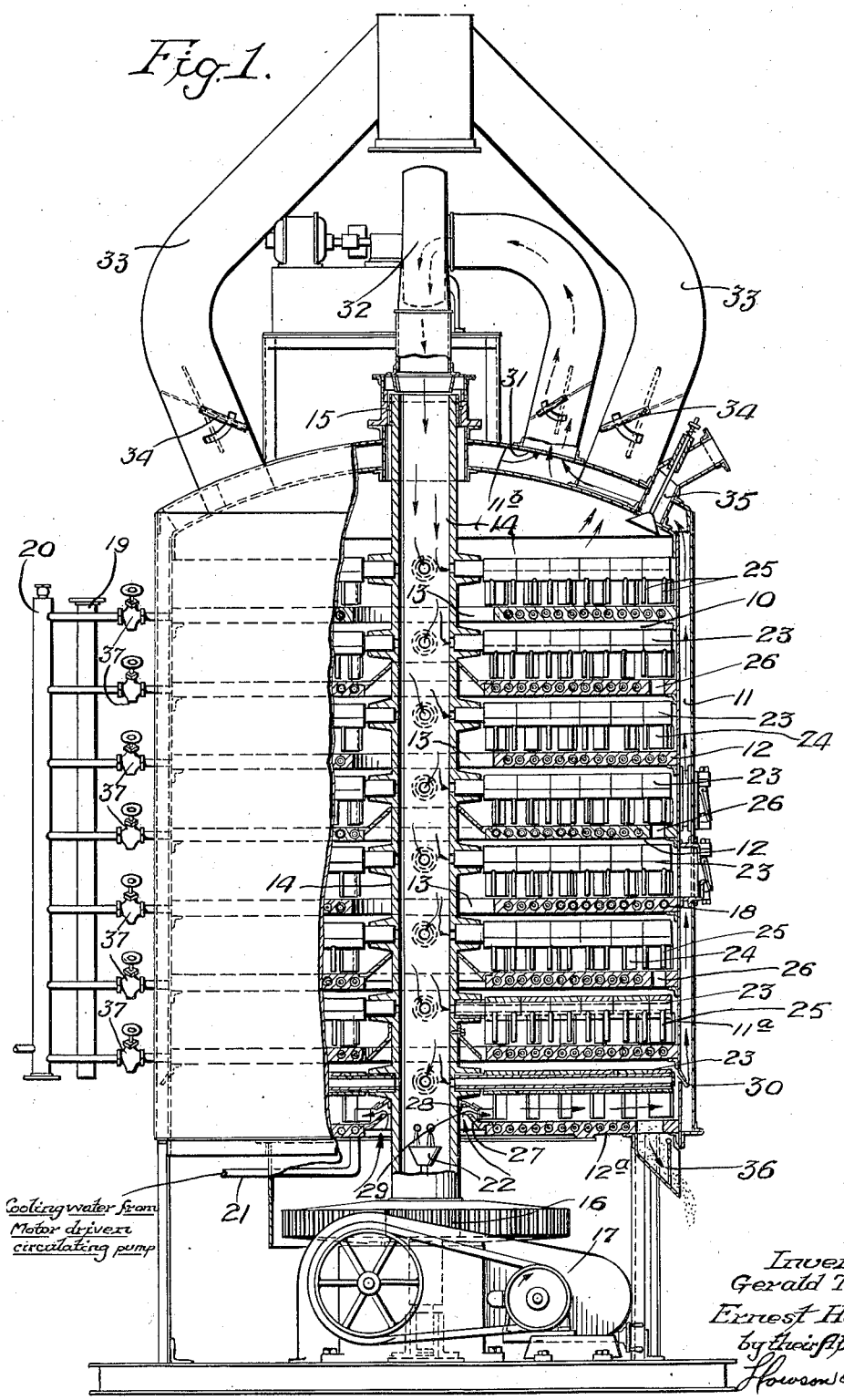
Fig. 1 is a side elevation partially in section of an apparatus constructed in accordance with our invention.

Referring now more particularly to the drawings, the numeral 10 generally designates a treating chamber the sides and top of which are defined by a hollow wall 11, at least the inner surface of which is formed of heat-conducting material. Within the chamber are arranged a series of vertically-spaced hearths 12 and 12a, the hearth 12a or lower hearth, forming the bottom wall of the chamber. Each hearth has an opening 13 at its center and projecting upwardly through the hearths is a rotary central shaft 14. The upper end of this shaft is open and projects through the upper wall of the chamber, a suitable seal being provided as indicated at 15, while the lower end of the shaft is closed and has secured thereto a gear 16. This gear is driven by a Reeves drive 17, that is to say, a drive in which variation of pulley diameters enables a micrometric variation of the speed of operation.

Figure 4:
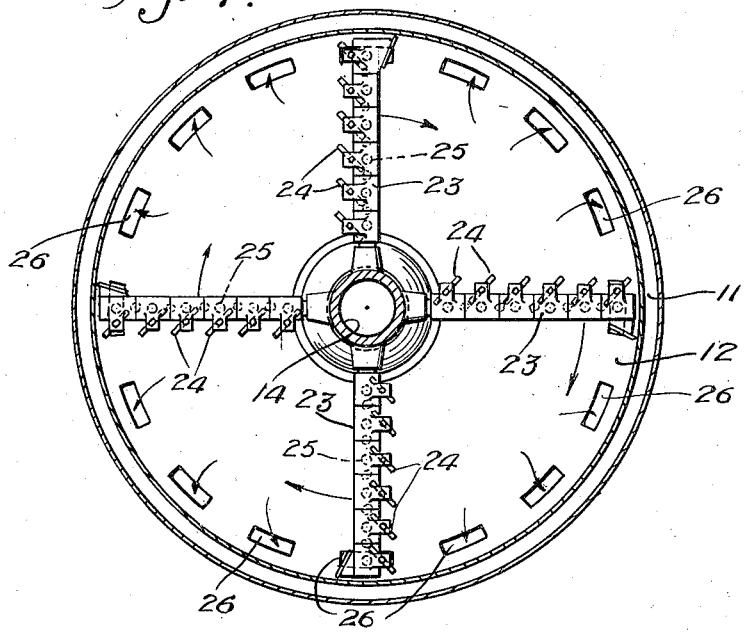
Figures 4 and 5 are sections through adjacent hearths showing the rabbling mechanism utilized.
Figure 5:
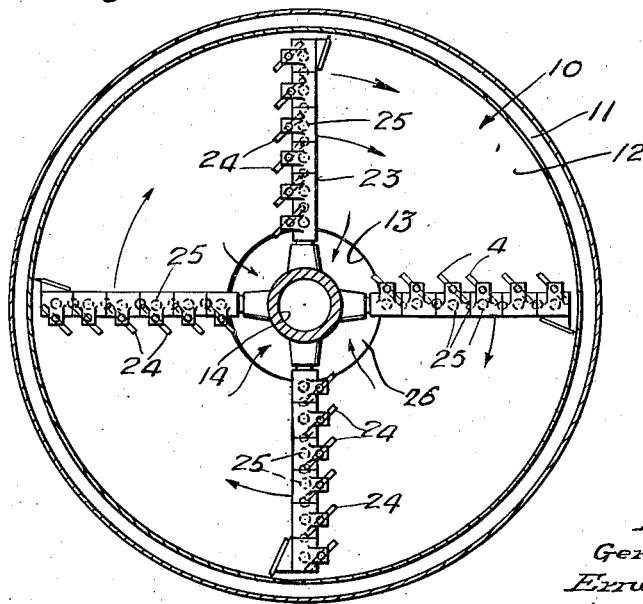

Each hearth comprises a solid body having embedded therein a circulating tube or tubes 18, the tubes of hearths 12 being connected at their opposite ends with supply and discharge headers 19 and 20 respectively for the circulation of a heating medium, while those of the lower hearth 12a are connected with a source 21 of cooling medium and a discharge 22 therefor. Projecting into the space between each pair of hearths and into the space between the upper hearth and the upper wall of the chamber are hollow rabble arms 23, the inner ends of which are secured to and in communication with the interior of shaft 14 so that these arms are cooled by air circulated through this hollow shaft, as hereinafter described. Each of the rabble arms overlying a hearth 12 has in addition to the rabble blades 24 secured thereto a series of small conduits 25 which communicate with the interiors of the rabble arms and have their lower ends arranged in close proximity to the upper surface of the associated hearth so that from these rabble arms air is delivered adjacent the upper surface of each hearth 12. The lower rabble arm associated with the hearth 12a is free from the small conduits 25. The rabbling blades are of the type usually employed on such hearths, being set at an angle so that the material is caused to project across the hearth and the arrangement of each hearth is such that an opening 26 is formed at either its inner (as in Fig. 5) or outer edge (as in Fig. 4) toward which the material is progressed and through which the material may fall to the next lower hearth.

The lower hearth has its inner edge defined by an upwardly and inclining flange 27 and the shaft above this flange has a downwardly and outwardly inclining flange 28, the flanges 27 and 28 overlapping to prevent passage of material through the space therebetween by gravity. The flange 27 is spaced from shaft 14 to afford an annular air inlet 29 at the inner edge of the hearth 12a and the inner wall 11a of the chamber wall at a point adjacent the top thereof is louvred as indicated at 30 so that air entering the inlet 29 may pass to the hollow interior of the chamber wall 11 and thus upwardly to an eduction duct 31 which communicates with the interior of the hollow wall through the outer section 11b thereof and with the inlet of a blower 32. This blower 32 discharges to the interior of the shaft 14 and it will be seen that the fresh air entering at 29 and passing upwardly will be preheated during its passage over hearth 12a about the peripheral walls of the upper hearths 12 prior to its delivery over the surface of these hearths. The air delivered to the hearths 12 through outlets 25 of the rabble arms, since it is heated, will tend to pass upwardly and may be liberated through discharge ducts 33, these ducts each having a control valve 34 for regulating the flow therethrough. The material may be admitted to the upper end of the chamber 10 through any suitable mechanism such as that generally shown at 35 and is passed successively over the hearths 12 and the hearth 12a from which it may be discharged through a suitable outlet 36.

It will be obvious that by regulation of the flow of the heating and cooling mediums through suitable valves 37 and by regulation of the speed of operation of shaft 14 through manipulation of the Reeves drive 17 the speed and heat of treatment can be very closely regulated and a very uniform treatment of the material provided. Close regulation is essential in the treatment of many food substances, particularly such substances as coffee or cocoa beans in which inadequate treatment or any treatment which will cause too great a loss of volatile content will result in an inferior product.

The construction illustrated is, of course, capable of considerable modification without in any manner departing from the spirit of our invention and we, accordingly, do not wish to be understood as limiting ourselves to the particular arrangement herein shown except as hereinafter claimed.

We claim:

1. In apparatus of the type described, a hollow-walled chamber, a plurality of vertically-spaced hearths in said chamber, means for cooling at least the lowermost of said hearths, means for heating the remainder of said hearths, means for causing material to move successively across said hearths from the upper to the lower end of the chamber, and means to circulate air over said lowermost hearth through the hollow wall of said chamber and then deliver the same to said heated hearths.

2. In apparatus of the type described, a chamber, a plurality of vertically-spaced hearths in said chamber, means for cooling at least the lowermost of said hearths, means for heating the remainder of said hearths, means for causing material to move successively across said hearths from the upper to the lower end of the chamber comprising rabbling arms, the rabbling arms of the heated hearths including air delivery pipes, and means to circulate air over said lowermost hearth and to deliver the same to the air delivery pipes of the heated hearths.

3. In apparatus of the type described, a chamber, a plurality of vertically-spaced hearths in said chamber, means for cooling at least the lowermost of said hearths, means for heating the remainder of said hearths, means for causing material to move successively across said hearths from the upper to the lower end of the chamber comprising rabbling arms, the rabbling arms of the heated hearths including air delivery pipes, and means to circulate air over said lowermost hearth and to deliver the same to the air delivery pipes of the heated hearths, said chamber having a hollow wall through which the air from said lowermost hearth is circulated prior to delivery to the heated hearths.

4. In apparatus of the type described, a chamber, a plurality of vertically-spaced hearths in said chamber, means for cooling at least the lowermost of said hearths, means for heating the remainder of said hearths, means for causing material to move successively across said hearths from the upper to the lower end of the chamber comprising rabbling arms, the rabbling arms of the heated hearths including air delivery pipes, means to circulate cooled air over said lowermost hearth and means to deliver such air after heating by passage over the material of the lowermost hearth to the air delivery pipes of the rabble arms of the heated hearths, the chamber having a hollow wall comprising a heating means for air delivered to the heated hearths.

5. In apparatus of the type described, a chamber, a plurality of vertically-spaced horizontally-disposed hearths in said chamber, means for cooling at least the lowermost of said hearths, means for heating the remaining hearths, said hearths having each a central opening, a centrally disposed hollow shaft, means to rotate said shaft, hollow rabble arms for said hearths carried by said shaft and communicating with the interior thereof, air delivery pipes carried by each of the rabble arms of the heated hearths and discharging adjacent the surface of the hearth and directly into the material during agitation thereof by the rabbling arms, and means to deliver heated air to the interior of said hollow shaft.

6. In apparatus of the type described, a chamber, a plurality of vertically-spaced horizontally-disposed hearths in said chamber, means for cooling at least the lowermost of said hearths, means for heating the remaining hearths, said hearths having each a central opening, a centrally disposed hollow shaft, means to rotate said shaft, hollow rabble arms for said hearths carried by said shaft and communicating with the interior thereof, air delivery pipes carried by each of the rabble arms of the heated hearths and discharging adjacent the surface of the hearth and directly into the material during agitation thereof by the rabbling arms, a blower having its intake connected with the space above the cooled hearth and its discharge communicating with the interior of said hollow shaft, and means to admit fresh air to the space above the cooled hearth.

7. In apparatus of the type described, a chamber having a hollow wall, a plurality of vertically-spaced horizontally-disposed hearths in said chamber, means for cooling at least the lowermost of said hearths, means for heating the remaining hearths, said hearths having each a central opening, a centrally disposed hollow shaft, means to rotate said shaft, hollow rabble arms for said hearths carried by said shaft and communicating with the interior thereof, air delivery pipes carried by each of the rabble arms of the heated hearths and discharging adjacent the surface of the hearth, a blower having its intake connected with the space above the cooled hearth and its discharge communicating with the interior of said hollow shaft, and means to admit fresh air to the space above the cooled hearth, the connection between the intake of the blower and the space above the cooled hearth comprising the hollow wall of said chamber.

8. In apparatus of the type described, a chamber, a plurality of vertically-spaced horizontally-disposed hearths in said chamber, means for cooling at least the lowermost of said hearths, means for heating the remaining hearths, said hearths having each a central opening, a centrally disposed hollow shaft, means to rotate said shaft, hollow rabble arms for said hearths carried by said shaft and communicating with the interior thereof, air delivery pipes carried by each of the rabble arms of the heated hearths and discharging immediately adjacent the surface of the hearth, and means to deliver heated air to the interior of said hollow shaft, the means to rotate said hollow shaft comprising a continuously variable transmission.

9. In apparatus of the type described, a chamber, a plurality of vertically-spaced horizontally-disposed hearths in said chamber, means for cooling at least the lowermost of said hearths, means for heating the remaining hearths, said hearths having each a central opening, a centrally disposed hollow shaft, means to rotate said shaft, hollow rabble arms for said hearths carried by said shaft and communicating with the interior thereof, air delivery pipes carried by each of the rabble arms of the heated hearths and discharging immediately adjacent the surface of the hearth, a blower having its intake connected with the space above the cooled hearth and its discharge communicating with the interior of said hollow shaft, and means to admit fresh air to the space above the cooled hearth, the means to rotate said hollow shaft comprising a continuously variable transmission.

10. In apparatus of the type described, a chamber, a plurality of vertically spaced hearths in said chamber, means for cooling at least the lowermost of said hearths, means for heating the remainder of said hearths, means for causing material to move successively across said hearths from the upper to the lower end of the chamber, air delivery pipes for delivering air to and about material moving over the heated hearths, means to circulate cool air over said cooled hearths and to deliver the same to the air delivery pipes of the heated hearths including a heating means through which the air is passed prior to delivery to the pipes of the heated hearths.

11. In apparatus of the type described, a chamber, a plurality of vertically spaced hearths in said chamber, means for cooling at least the lowermost of said hearths, means for heating the remainder of said hearths, means for causing material to move successively across said hearths from the upper to the lower end of the chamber, air delivery pipes for delivering air to the heated hearths, means to circulate cool air over said cooled hearths and to deliver the same to the air delivery pipes of the heated hearths including a heating means through which the air is passed prior to delivery to the pipes of the heated hearths, said chamber having a hollow wall comprising said heating means.

GERALD THORP.
ERNEST HALSE.